United States Patent [19]
Hammer et al.

[11] Patent Number: 5,510,579
[45] Date of Patent: Apr. 23, 1996

[54] WIRE RETAINER FOR CONNECTING WIRES IN LOW-VOLTAGE CIRCUITS OF ELECTRICAL APPARATUS

[75] Inventors: Dieter Hammer, Waiblingen; Bernhard Albeck, Lorch-Waldhausen, both of Germany

[73] Assignee: Vossloh Schwabe GmbH, Urbach, Germany

[21] Appl. No.: 227,617

[22] Filed: Apr. 14, 1994

[30] Foreign Application Priority Data

Apr. 20, 1993 [DE] Germany ............... 43 12 779.7

[51] Int. Cl.[6] ............................................. H01B 17/16
[52] U.S. Cl. ................. 174/168; 174/135; 174/72 A; 248/73; 248/74.1
[58] Field of Search .............................. 248/74.1, 73, 71; 174/168, 72 A, 135; D8/356

[56] References Cited

U.S. PATENT DOCUMENTS

| 3,444,596 | 5/1969 | Soltysik | 248/73 |
| 3,555,923 | 1/1971 | Seckerson | 248/71 |
| 4,681,288 | 7/1987 | Nakamura | 248/71 |
| 4,695,018 | 9/1987 | Carswell et al. | 248/74.2 |
| 4,840,334 | 6/1989 | Kikuchi | 248/73 |

FOREIGN PATENT DOCUMENTS

| 1850860U1 | 5/1962 | Germany. |
| 7036247U1 | 1/1971 | Germany. |
| 2623040A1 | 11/1977 | Germany. |
| 3737113C1 | 3/1989 | Germany. |
| 8913369U1 | 2/1990 | Germany. |
| 2081363A | 2/1982 | United Kingdom. |

*Primary Examiner*—Kristine L. Kincaid
*Assistant Examiner*—Paramita Ghosh
*Attorney, Agent, or Firm*—Frishauf, Holtz, Goodman, Langer & Chick

[57] ABSTRACT

A wire retaining for connecting wires in low-voltage circuits of electrical apparatus has a continuous channel (5), formed on a shaped part, for receiving the wires. The channel is designed for the passage through it over its length of a wire placement tool protruding through its lateral wire insertion opening and moving in the longitudinal direction of the wire; legs (3) laterally defining the channel, and/or wire hold-back devices (7), are embodied as predominantly spring-elastically yielding to the tool passing through.

19 Claims, 3 Drawing Sheets

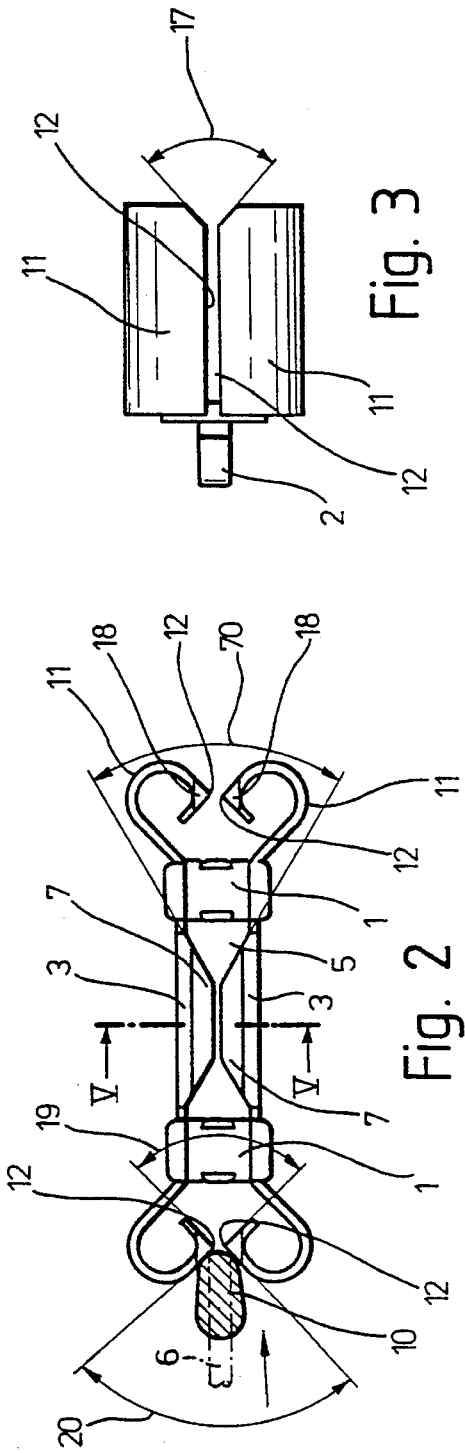

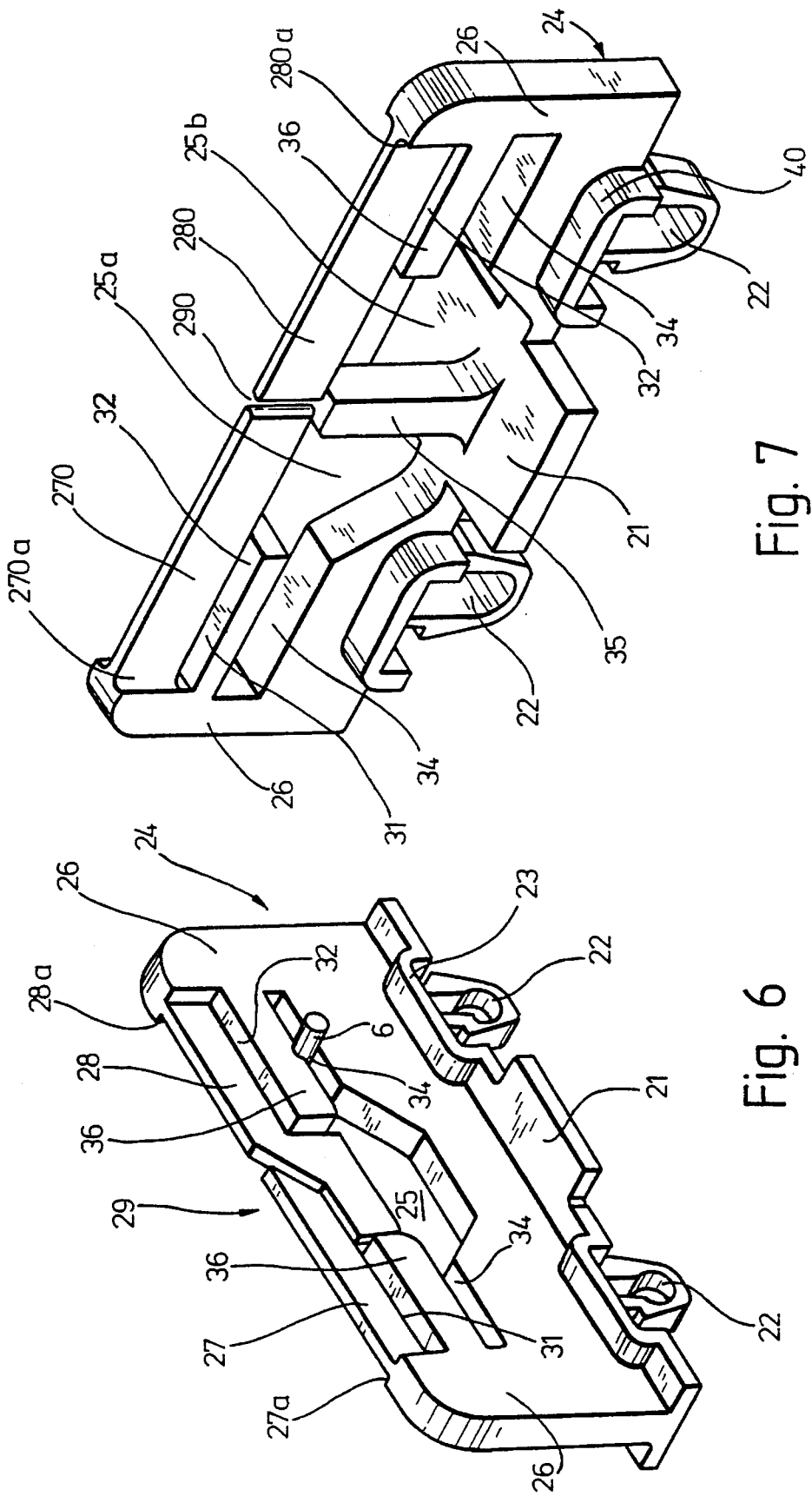

WIRE RETAINER FOR CONNECTING WIRES IN LOW-VOLTAGE CIRCUITS OF ELECTRICAL APPARATUS

Reference to related application, the disclosure of which is hereby incorporated by reference.

U.S. application Ser. No. 08/217,235, filed Mar. 24, 1994, Koller et al.

1. Field of the Invention

The invention relates to a wire retainer for connecting wires in low-voltage circuits of electrical apparatus, having a base provided with fasteners and having at least two legs joined to the base, between which legs a continuous channel receiving the wires is defined, which is open on one side over its length, forming a wire insertion opening, and to which spring-elastic hold-back means for wires received in the channel are assigned, these wires normally being in a position that defines the free through cross section of the channel and/or of the lateral wire insertion opening.

2. Background

In the wiring of low-voltage circuits, e.g. to about 220 to 340 V, of electrical apparatus, such as in switchboxes, luminaires or fixtures, etc., but also on circuit boards or circuit panels and the like, the electrical wires extending between the various connection points of the circuit elements are either assembled into often prefabricated cable or wire harnesses, or placed individually. It is known in the industry to fasten cable harnesses to a substrate by means of holding rings, group holders, retaining strips, etc., in order to attain a mechanically stable apparatus design. Also, relatively long wires that are placed individually require support and retention at intermediate points, in order to define precisely defined wire paths and to assure that no undesired movability of the wires occurs, which leads to unacceptable shifting of lines when the apparatus is in operation. In the industry, there is a large number of versatile wire holders for wires, including those in the form of round and flat cables, which are embodied for instance in clip form or in the manner of U-shaped bows, between whose legs the various wires are retained. Straps, tabs or lidlike parts are formed onto the free ends of the legs, acting as hold-back means for the wires after the placement of the wires in the channel by locking in place either in a single operation or snapping together automatically, in order to close the wire insertion opening enough that the wires can no longer escape from the channel.

It is a feature common to these known wire retainers that they are formed such that the wires are pressed into the channel receiving them through the insertion opening in a motion oriented transversely to their longitudinal direction.

With increasing rationalization of apparatus manufacture, the need arises for performing wiring automatically, without needing recourse to prefabricated cable harnesses. To that end, a wire placement tool is used, which is moved under program control by a robot along a predetermined placement path between the connection points to be connected together, and which in the process carries the wire, supplied to it in endless fashion from a roll, from one connection point to the next. If the arrangement of connection points requires relatively long wire lengths, then as already noted wire retainers must be provided at intermediate points along the placement path; these wire retainers must be stationary and must be inserted into the wires.

The wire retainers known thus far require either that the wire placement tool undertake its own operation of placing the wires in the wire retainers, which as a rule requires additional placement motions oriented transversely to the placement direction, or the wires, after placement, must be inserted by hand into the wire retainers, whose wire hold-back means may also have to be closed by hand afterward.

THE INVENTION

It is an object to create a wire retainer for connecting wires in low-voltage circuits of electrical apparatus that is suitable for fully automatic production of the wiring, in particular using a wire placement tool moved along a predetermined placement path, in such a way that it does not delay the wiring process.

Briefly, the channel is designed so that a tool protruding through the insertion opening and moving in the longitudinal direction of the wire can pass through it over its length, and the legs defining the channel and/or the hold-back means are formed so as to yield predominantly spring-elastically to the tool traveling through.

This design of the novel wire retainer means that the placement tool can pass through the wire retainer in its placement motion along the defined placement path in a simple way, without as a rule having to change its speed. After the passage of the placement tool and the insertion of the respective wire into the channel taking place in that passage, the predominantly resiliently yielding hold-back means return to their original starting position, in which the wire is securely held without requiring additional provisions, especially manual ones, for the purpose. In addition, however, wires may also be inserted through the insertion openings by hand if needed and are equally securely held.

In one embodiment, it may have at least one holding member, which is formed and/or supported to yield spring-elastically. The holding member may have a flexible tongue supported laterally of the wire insertion opening, and in a preferred embodiment the arrangement is such that one such flexible tongue is located on each side of the channel. The two tongues may be formed with their free ends either ending a short distance from one another or overlapping one another. Very simple conditions result if each tongue is formed as a thin small plate standing on edge, which can be swiveled spring-elastically to the side or bent in a simple way by the tool passing through, in the manner of a swinging door, and which then under the influence of its intrinsic elasticity returns to its effective outset state.

DRAWINGS

Exemplary embodiments of the subject of the invention are shown in the drawing.

FIG. 2 is a plan view on a different scale of the wire retainer of FIG. 1;

FIG. 3 is a side view of the face end from the left of the wire retainer of FIG. 2;

FIG. 4 is a side view of the wire retainer of FIG. 2;

FIG. 5 is a side view of the wire retainer of FIG. 4, in a section taken along the line V—V of FIG. 2;

FIG. 6 is a perspective view of a wire retainer according to the invention in a second embodiment; and FIG. 7 is a perspective view on a different scale of the wire retainer of FIG. 6, in a modified embodiment.

DETAILED DESCRIPTION

Figure 1:
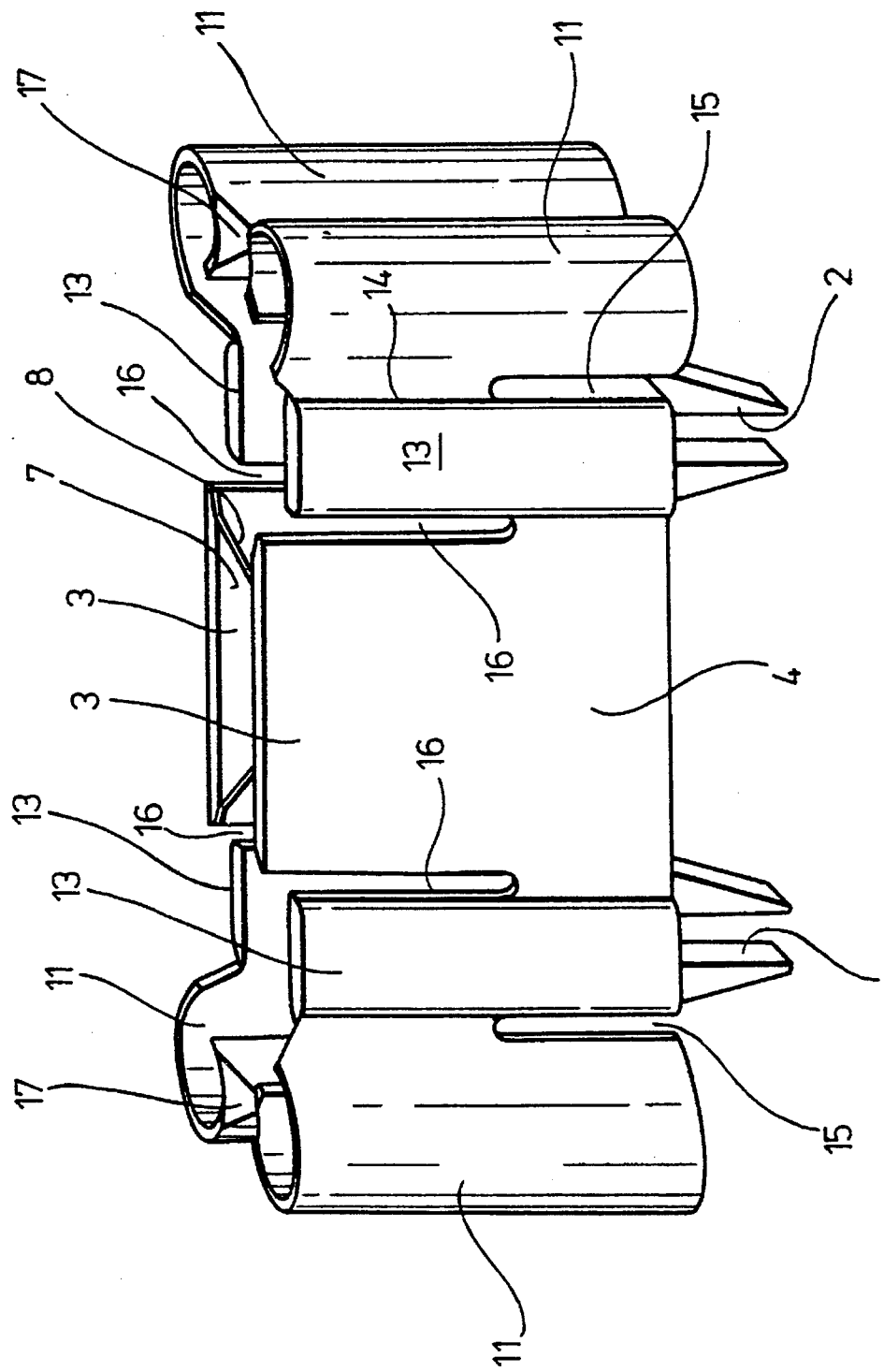
FIG. 1 is a perspective view of a wire retainer according to the invention, in a first embodiment.

The wire retainer shown in a first embodiment in FIGS. 1–5 has a base that comprises two flat bottom parts 1, each with a formed-on detent foot 2. The two detent feet 2 permit rapid assembly of the wire retainer by pressure-detent fastening in corresponding bores of the apparatus base plate.

Finally, fixation of the wire retainer in a manner secure against relative rotation is assured.

The two bottom parts are adjoined by two spaced-apart legs 3 facing one another, which are formed onto a continuous striplike wall portion 4 between the two bottom parts and which together with the wall portions 4 define a straight continuous channel 5 that serves to receive wires suggested at 6 (FIG. 5). In the region of the upper edges, two thin strips 7 are formed onto the two flat legs 3, and in the manner particularly visible from FIG. 5, these strips, extending obliquely inward in funnellike fashion (at 80), with their free parallel long edges 8, define a wire insertion opening, extending over the length of the channel 5, on the top of the wire retainer. On their face ends, the essentially trapezoidal strips 7 are inclined inward in funnellike fashion (at 70), thereby forming an insertion slope for a wire placement tool suggested at 10 and to be described hereinafter.

Adjoining the face end of the channel 5, on both sides of the legs 3, wire clamping means are provided, each of which comprise two partially cylindrically rolled-in clamping bows 11, which with mutually parallel formed-on clamping edges 12 define a clamping point located symmetrically to the longitudinal plane of symmetry of the channel 5 and extending over the height of the channel 5. The spacing between the two straight edges 12 is less than the diameter of the wires 6 to be inserted, so that these wires are securely held in a row located one above the other, i.e. in ordered, or predetermined position relative to each other at the respective clamping point between the edges 12 (see FIG. 5).

On each face end, the two clamping bows 11 are formed at 14 onto two striplike retaining arms 13 which form wall portions of the channel 5 and are formed onto the respective wall portion 4 above the bottom parts 1. To increase their hingelike elastic movability along the fastening lines at 14, they are each separated from the fastening arms 13, over a portion of their height beginning at the bottom parts 1, by a respective slit 15. On the other side, a separating slit 16 extending from the top is likewise provided between each holding arm 13 and the adjacent leg 3; this slit extends up to the continuous wall portion 4 and increases the elastical movability of the legs 3 transversely to the longitudinal center plane of the channel 5.

Finally, in the region of the clamping point defined by the two vertical edges 12, each pair of clamping bows 11 has insertion slopes 17, running together in funnellike fashion from top to bottom, which make it easier to insert wires 6 into the respective clamping point and into the channel 5. The edges 12 defining the clamping point are the vertical corner edges of two angle pieces 18 formed onto the respective pair of bows 11; the angle pieces are located such that on each side longitudinally of the channel they form a respective angle 19 or 20 (FIG. 2) of 90° with one another. Finally, the slits 15, 16 extend from below or above approximately as far as a common plane 65, which is oriented parallel to the base.

Operation, and placing a wire:

In automatic placement of a wire 6, the wire is brought with its free end from the left, in terms of FIG. 2, to the face end of the wire retainer by the placement head of the wire placement tool 10. The tool is moved according to the program. The wire placement head enters the angular region 20, by whose boundary faces the wire retainer is automatically aimed exactly at the wire 6 grasped in the wire placement head 10. In the course of the forward motion of the wire placement head 10, the two bows 11 are spread apart spring-elastically, so that yielding to the side, they leave the wire placement head 10, which enters the angular region 19 immediately behind the edges 12 and from there moves between the holding arms 13 and then into the channel 5.

Since the edges 12 extend at the apex of two opposed angle pieces 18, the bows 11 immediately return automatically, under the influence of their intrinsic elasticity, to their outset clamping position (FIG. 2), as soon as the wire placement head 10 has moved through the bottleneck or clamping point between the edges 12. One of the bows 11 forms a counter element for the other, thus clamping the wire 6 therebetween. It is thus achieved at the edges 12, upon passage of the wire placement head, directly engage the wire 6 clampingly from behind and restrain it by frictional engagement, thus assuring an exactly ordered placement of the wire.

The wire placement head 10 entering the channel 5 meets the face-end insertion slopes 70 of the two strips 7; the legs 3 with the strips 7 are elastically yieldingly forced to the side, and after the passage of the wire placement head, they return to their outset position shown in FIG. 2, preferably before the wire placement head 10 enters the bottleneck or clamping point between the edges 12 of the two pairs of bows 11 at the right side of FIG. 1. Since the entry into this bottleneck or clamping point takes place through the angle region 19 which tapers in funnellike fashion, the bows 11 of the second pair of bows, upon passage of the wire placement head 10, are likewise curved open, yielding spring-elastically toward the side. They automatically close behind the wire placement head, whereupon the placed wire 6 is firmly clamped in exactly the correct position, by frictional engagement, on this end of the wire retainer as well.

Since the edges 11 on both face ends of the wire retainer are the corner edges of respective angle pieces 18, which form an angle of 90° with one another, upon the further placement motion of the wire placement head, the wire 6 can easily be axially penetrated by the wire retainer, without the bows getting caught in the wire insulation or being able to damage it.

The embodiment of the bows 11 and of the clamping points, oriented vertically and defined by the edges 12, as described assures that wires 6 placed in succession above each other will be retained in rows, one above the other, in an exact vertical orientation between the edges 12, as suggested in FIG. 5. For all these wires 6, the same placement path is therefore applicable in the vicinity of the wire retainer; horizontal bends in the wires at a common bending point can be done with the same radius.

For instance if in common with the wires 6, which preferably have the same outside diameter, thinner wires must be placed, or if it is important to assure that when wiring is installed in the ceiling, for instance, the wires 6 will not in time slide out of their clamping retainers between the edges 12, the inwardly pointing strips 7 that cover the channel 5 come into action. With their free edges, they protrude across the inside diameter of the clamping points between the pairs of edges 12 and thus assure a form-fitting retention of the wires 6 received in the channel 5. Since the strips 7 are bent inward in hooklike fashion (see FIG. 5), even wire segments that for whatever reasons are not held in the clamping points between the pairs of edges 12 will be securely held. This is suggested in FIG. 5 by means of two wires 60, which illustrate how the wires can become caught under the strips 7 in the channel 5. At the same time, the inclined position of the strips 7 together with the insertion slopes 17 also enable a vertical insertion of the wires from above.

FIGS. 6, 7 show two further embodiments of novel wire retainers, which are likewise distinguished by being suited and intended for automatic wire placement using a wire placement head 10 and by having a channel, intended for receiving wires, which is designed so that the wire placement head can move through it over its length; the hold-back means for the wires define the channel and are embodied to yield predominantly spring-elastically to the wire placement tool or head passing therethrough; the wire placement tool protrudes into the channel from above through the insertion opening.

In the embodiment of FIG. 6, a plate-like base 21 is provided, on which two detent feet 22 are formed, resting in an axially somewhat indented manner in U-shaped outward-bent recesses 23. A shaped part 24 is joined in one piece to the base 21, formed essentially as a rectangular plate that is penetrated transversely by a channel 25 of approximately trapezoidal cross section for holding a wire. The channel 25 is defined on both sides by regions of the plate that form two legs 26, and on both sides of the channel 25 two flexible holding members in the form of two spring-elastic thin tongues 27, 28 are formed onto the ends of these legs. The thickness of the tongues 27, 28 is less than the thickness of the shaped part 24; they can therefore be called thin small plates, which are formed standing on edge on their respective roots at 27a and 28a, respectively, onto the shaped part 24. The two tongues 27, 28 protrude across the inside diameter of the channel 25 and are formed to overlap one another at 29. Since they are each freed over their length at 31, 32 via a slit in the shaped part 24, they can yield to the side in a spring-elastic fashion, in the manner of swinging doors, upon the wire placement head 10 passing through, and after it has passed through, they can return to their outset position shown in FIG. 6, whereupon the wire 6 placed in the channel 5 is securely enclosed and retained, and the insertion opening at the top is closed.

On both sides of the channel 25 below the two tongues 27, 28, pocketlike enlargements 34 begin at the tongues. The enlargements are in the form of slits 34 defined by parallel sides between a portion of the legs 26 and prong-like extensions 36. The width of the slits 34 is selected to be somewhat less than the diameter of the wires to be laid. These enlargements form wire reception slits or pockets 34.

The various wires 6, after placement in the channel 25, are thrust into the respective slit at 34 by a small lateral placement motion of the wire placement head 10, as is shown in FIG. 6 for one wire 6. This insertion is facilitated by the trapezoidal cross section of the channel 25. The wires 6 are retained in the slits, ordered precisely, side by side, in frictional engagement. In principle, it would naturally also be possible to provide corresponding pockets or slots 34 on the bottom side of the channel 25, to enable lining up the wires 6 vertically.

The embodiment of FIG. 7, finally is essentially identical to that of FIG. 6. Identical parts are therefore provided with the same reference numerals and are not described again.

Differing from the embodiment of FIG. 6, the channel 25 here is subdivided longitudinally, by a pinlike separator member 35 protruding upward from the base 21, to form two partial channels 25a, 25b extending side by side, so that the groups of wires placed there can be separated from one another. The two tongues 270, 280 are identical in this case. They take the form of two rectangular, elongated, thin strips, which protrude tightly against one another at the face end in the region above the separator member 35, at 290, and thus together with the separator member assure a form-fitting closure of the two channels 25a, 25b.

Once again, the two tongues 270, 280 yield spring-elastically to the side-in the manner of swinging doors if a wire placement head 10 is passing through the respective channel 25a or 25b and places a wire 6 in it, which then by a small lateral placement motion is inserted via the inclined channel wall into the adjacent horizontal pocketlike enlargement 34, in which it is held by frictional engagement.

The wire retainers shown in various embodiments are all made in one piece from plastic, such as polyethylene or polyamide. Their fastening devices are shown only by way of example; they may also be formed differently. As a rule, however, it must be assured that fastening of the respective wire retainer on its substrate is done in a manner secure against relative rotation, so that the wire placement tool can gain an entry into the respective channel 5 or 25.

The tongues 27, 28, or 270, 280 in the embodiments of FIGS. 6 and 7, respectively may also be in the form of bars, and it is also possible for a plurality of platelike shaped parts 24 to be located, spaced apart from one another, on the same base.

The novel wire retainer, both in the embodiment of FIGS. 1–5 and in the embodiment of FIG. 6 or 7, can be penetrated from both sides by the wire placement tool. The hold-back means for the wires placed in the channels 5 and 25 and 25a, 25b are either form-fitting, like the strips 7 (FIG. 1) or the tongues 27, 28 or 270, 280 (FIGS. 6, 7), or may also be friction-locking, like the clamping points formed between the edges 12 of the resilient bows 11 (FIG. 2) or the clamping points between the boundary walls of the pocketlike enlargements 34 in FIGS. 6, 7. Since these pocketlike enlargements are limited at the top by pronglike extensions 36, which are formed onto the associated leg 26 at only one end, these pronglike extensions 36, upon placement of the wires, may be designed to yield somewhat elastically upward and/or spring-elastically to the side. In the embodiment of FIG. 6, they protrude into the channel 25, so that if needed, they can also be swiveled elastically to the side by the placement tool as it moves through.

Finally, in the embodiment of FIGS. 1–5, the channel 5 may also be subdivided into at least two parallel partial channels, similarly to FIG. 7, by means of a separator member standing upright, in the form of a partition.

For identification of the wire retainers and/or the wires retained in them, the base 1 or 21 and/or some part connected to it may be provided with a code 40 that can be read off by a sensor on the wire placement head 10. Examples of this are schematically suggested in FIGS. 4 and 7.

In the embodiment of FIGS. 1–5, spring-elastic bows 11 are provided at each clamping point 2. In principle, other embodiments are also possible in which only one such spring-elastic bow 11 is provided, with a movable clamping edge 12 that cooperates with a fixed, rigid abutment, for instance in the form of a corresponding platelike prolongation of the opposite arm portion 13. This abutment, too, may be formed with at least one clamping edge 12.

Suitable clamping means, of the kind formed by the spring bows 11, may also be formed onto the platelike shaped parts 24 in the embodiments of FIGS. 6, 7.

In order to assure an ordered arrangement of the retained wires, the channel 25 may have at least one pocketlike enlargement 34, whose inside diameter is less than or equal to the outside diameter of the wire. The wires are firmly clamped in this pocketlike enlargement; they are in a row next to or one above the other. Inserting the wires from the channel into the pocketlike enlargement can be done by the placement tool itself, which for that purpose executes a slight lateral motion if needed.

It is also possible for the channel 25 to be subdivided longitudinally by at least one separator member 35 protruding from the bottom, resulting in a double or multiple channel, in which the various wires or groups of wires are retained separately from one another.

The wire retainer is made entirely in one piece of an insulating plastic, such as polyethylene or polyamide; in its shape, it can be extensively adapted to the requirements of an intended use. For instance, the channel 25 can extend through a shaped part 25, joined to the base 21 and containing the legs 26, which is formed essentially as a plate oriented transversely to the longitudinal direction of the channel.

In other embodiments, the legs that define the channel are in the form of longer wall parts, so that the wires are laterally supported and retained over a greater length.

It has proved advantageous if the wire retainer has spring-elastic clamping means 11, adjoining the channel 5 on at least one face end, for wires 6 placed in the channel. These clamping means have the effect that upon the inward motion of the wire placement tool into the channel, which is done from the face end, the tool first passes through the clamping means, which after the passage of the placement tool immediately press self-clampingly against the inserted wire and positionally restrain it, before the placement tool has passed through the channel itself and released the segment of wire located in the channel.

In a practical embodiment, the clamping means may have at least one spring-elastic clamping bow 11, which extends over the height of the channel 5 and, with a clamping bow 11 or an abutment opposite it defines a clamping point. In this clamping point, wires placed successively are retained in a row, located one above the other, in precise order; this has the advantage that of producing wire placement paths of equal length and equal design for the various wires, at least intermittently, in the vicinity of the wire retainer. That is, if the wires were placed side by side or even in unordered fashion, then different placement paths in the horizontal plane would occur at bends in the common placement path, making it difficult to program the placement tool or leading to undesired crossings of lines.

To increase the clamping action, it is practical if the clamping point, at least on one side, is defined by a clamping edge 12 on a clamping bow 11 or on the abutment. One such clamping bow and/or the abutment may also have an insertion chamber 20, pointing inward in funnellike fashion, for the wire placement tool 10, which can be attained in a simple way by providing that the clamping bow 11 has a wall portion rolled inward essentially in partially cylindrical fashion, which wall portion rolled inward in partially cylindrical fashion is located on a retaining arm 13 joined to the base 1 or to a leg 3, with which arm it is joined over at least a portion of its height. To increase the movability, the retaining arm 13 may be separated from the adjacent leg 3 by a slit 16, which extends over at least a portion of the height of the leg 3.

To facilitate the passage of the placement tool through the channel, the holding member 7 located on at least one leg 3 may have on its face end an insertion slope 70, pointing inward in funnellike fashion, for the tool. Moreover, to facilitate the manual insertion of additional wires, this holding member, like the aforementioned clamping means, mat be formed with an insertion slope, inclined toward the channel bottom, for the wires.

The fastening means located on the base, which for instance are in the form of protrusions, spreader hoops or the like, are suitably formed such that the wire retainer is secured against relative rotation, and accordingly always maintains its alignment as required for the passage through the channel of the wire placement tool. Finally, a code 40 readable from outside may be located on the base 1, 21 or on some part joined to it, which enables identification of the respective wire retainer, on the one hand, and/or of the various inserted wires, on the other, by means of code recognition means located on the wire placement tool.

Various changes and modifications may be made, and features described in connection with any one of the embodiments may be used with any of the others, within the scope of the inventive concept.

We claim:

1. A wire retainer for connecting wires (6) of low-voltage circuits of electrical apparatus, to retain said wires (6) in ordered, predetermined position with respect to each other, comprising a base (1, 21);

fasteners (2) secured to the base (1);

at least two legs (3, 26) joined to the base, between which legs a continuous channel (5, 25) for receiving the wires (6) is defined, said channel being open on one side over its length, and having a wire insertion opening (20); and wire holding means (11, 26, 36) for wires (6) received in the channel, which wires are normally located in the channel, elastic wire hold-back means (7; 27, 28; 270, 280) coupled to the legs (3, 26); and means for assuring ordered arrangement of the wires in the retaininer including wire clamping means (12; 34) coupled to the base (1, 21) and positioned for engagement with the wires (6) in the retainer, and wherein the channel (5, 25) is dimensioned and arranged to receive a wire placement tool (10) protruding through the insertion opening moving in the longitudinal direction of the wires and passing through said channel over its length; and wherein at least one of the legs (3; 26) defining the channel, the wire holding means (11, 26 36) and the hold-back means (7, 27, 28; 270, 280) are formed to yield spring-elastically to the tool.

2. The wire retainer of claim 1, wherein the hold-back means (7) are located on at least one of the legs (3) and have, on its face end, an insertion slope (70), pointing inward in funnel-like fashion towards said channel (5, 25).

3. The wire retainer of claim 1, wherein the hold-back means (7) are formed with an insertion slope (8; 17), inclined toward the bottom of the channel (5, 25) for the wires.

4. The wire retainer of claim 1, wherein the base (1) has an aperture leading into the channel (5).

5. The wire retainer of claim 1, wherein the fasteners (2) located on the base (1, 21) are formed to be secure against relative rotation.

6. The wire retainer of claim 1, wherein a code (40) readable from outside is located on the base (1, 21) or on some part joined to it.

7. The wire retainer of claim 1, wherein said retainer comprises a unitary plastic element.

8. A wire retainer for retaining connecting wires (6) of low-voltage circuits of electrical apparatus, to retain said wires (6) in ordered predetermined position with respect to each other, comprising a base (1);

fasteners (2) secured to the base;

at least two legs (3) joined to the base, between which legs a continuous channel (5) receiving the wires is defined, said channel being open on one side over its length and having a wire insertion opening (20), said channel being dimensioned and arranged to receive a wire placement tool (10) protruding through the insertion opening moving in the longitudinal direction of the wires and passing through said channel over its length;

wire holding means (11) for said wires received in the channel (5) normally located in the channel;

clamping means (11) located laterally adjacent of said channel on at least one face end, for holding the wires placed in the channel in said ordered position in the retainer.

said clamping means having at least one spring elastic clamping bow (11) engageable with at least one of the wires, and a counter element, said clamping bow and counter element extending over the height of the channel (5), wherein the clamping bow and the counter element define a clamping point, said clamping point, at least on one side, being formed by a clamping edge (12) on at least one of the clamping bow (11) and the counter element; and wherein the clamping bow defines an inwardly directed funnel-like formed portion, said formed portion defining said insertion opening.

9. The wire retainer of claim 8, wherein said counter element comprises a clamping blow, whereby said clamping bows, outwardly of said channel (5), define an inwardly pointing, with respect to the channel, funnel-like entrance region for the wire placement tool (10).

10. The wire retainer of claim 9, wherein said formed portion of the clamping bow comprises a wall portion which is rolled inwardly in essentially cylindrical shape.

11. The wire retainer of claim 10, wherein the wall portion rolled inward in partially cylindrical fashion is located on a retaining arm (13) joined to the base (1) or to one of the legs (3);

and wherein said arm is joined to said wall portion over at least a portion of the height of the wall portion.

12. The wire retainer of claim 11, wherein the retaining arm (13) is separated from the leg (3) by a slit (16), which extends over at least a portion of the height of the leg (3).

13. A wire retainer for retaining connecting wires (6) of low-voltage circuits of electrical apparatus, to retain said wires (6) in ordered predetermined position with respect to each other, comprising a base (21);

fasteners (2) secured to the base;

at least two legs (26) joined to the base, between which legs a continuous channel (25) receiving the wires is defined, said channel being open on one side over its length and having a wire insertion opening;

wire holding means (36) for said wires received in the channel (25) normally located in the channel;

wherein said wire holding means comprise at least one prong-like extension (36) supported laterally of the wire insertion opening and extending, with spacing, from said base (21); and elastic wire hold-back means (27, 28) supported laterally of the wire insertion opening formed on at least one of said legs (26); and wherein said channel is adapted to receive a wire placement tool (10) protruding through the insertion opening, moving in the longitudinal direction of the wires and passing through said channel (25), said prong-like extension (36) projecting from one of the legs (26), together with an adjacent portion of said one leg, forming a clamping means (34) for said wires located in the space between the prong-like extension (36) and the the leg.

14. The wire retainer of claim 13, wherein said wire hold-back means comprises two flexible tongues (27, 28), each being located on a respective side of the channel (25).

15. The wire retainer of claim 14, wherein the two tongues (27, 28) are formed with their free ends overlapping one another.

16. The wire retainer of claim 14, wherein each tongue (27, 28) is formed as a thin small plate standing on edge.

17. The wire retainer of claim 13, wherein the clamping means (34) comprises a slit (34) which extends to the space between the respective prong-like extension (36) and the adjacent portion of the leg, the spacing being less than or equal to the outside diameter of the wires to be received by the retainer, said slit communicating with the channel (25).

18. The wire retainer of claim 14, further comprising at least one separator member (35) protruding from the bottom and longitudinally subdividing the channel.

19. The wire retainer of claim 13, wherein the channel (25) extends through a shaped portion (24) of the base (21) containing said legs (26), said prong-like extensions (36), and said tongues (27, 28); and wherein said shaped portion is formed essentially as a plate oriented transversely with respect to the longitudinal direction of the channel (25).

* * * * *